US011408972B2

(12) United States Patent
Wirola et al.

(10) Patent No.: US 11,408,972 B2
(45) Date of Patent: *Aug. 9, 2022

(54) DEVICE-CENTRIC LEARNING OF MANIPULATED POSITIONING

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,662

(22) Filed: Dec. 20, 2019

(65) Prior Publication Data

US 2020/0200865 A1 Jun. 25, 2020

(30) Foreign Application Priority Data

Dec. 20, 2018 (EP) .................................... 18214716

(51) Int. Cl.
*G01S 7/02* (2006.01)
*G01S 13/08* (2006.01)
*G06F 9/54* (2006.01)

(52) U.S. Cl.
CPC .............. *G01S 7/021* (2013.01); *G01S 13/08* (2013.01); *G06F 9/542* (2013.01)

(58) Field of Classification Search
CPC ........... G01S 7/021; G01S 13/08; G06F 9/542
See application file for complete search history.

(56) References Cited

U.S. PATENT DOCUMENTS

| 6,049,333 | A | 4/2000 | LaJoie et al. |
| 6,448,925 | B1 | 9/2002 | Shridhara |
| 6,501,956 | B1 | 12/2002 | Weeren et al. |
| 7,305,232 | B2 | 12/2007 | Ono et al. |
| 7,312,752 | B2 | 12/2007 | Smith et al. |
| 7,574,202 | B1 * | 8/2009 | Tsao .................... H04L 63/0272 455/411 |

(Continued)

FOREIGN PATENT DOCUMENTS

| CN | 106597363 A | 4/2017 |
| EP | 2 746 813 A1 | 6/2014 |

(Continued)

OTHER PUBLICATIONS

Extended European Search Report for Application No. EP 18 21 4721 dated Jul. 22, 2019, 7 pages.

(Continued)

*Primary Examiner* — Amine Benlagsir
(74) *Attorney, Agent, or Firm* — Alston & Bird LLP

(57) ABSTRACT

A method is disclosed that includes maintaining a database comprising identifying information indicative of one or more radio nodes and/or of one or more areas within which the one or more radio nodes are located. Each respective radio node of the one or more radio nodes is configured to enable positioning based on radio signals sent by the respective radio node. The positioning enabled by the respective radio node is considered to be at least partially unexpected. A corresponding apparatus, computer-readable storage medium and system are also provided.

20 Claims, 5 Drawing Sheets

(56) References Cited

U.S. PATENT DOCUMENTS

| | | |
|---|---|---|
| 7,716,740 B2 | 5/2010 | Robert et al. |
| 7,788,382 B1 | 8/2010 | Jones et al. |
| 7,859,462 B2 | 12/2010 | Small |
| 7,970,894 B1 * | 6/2011 | Patwardhan ......... H04W 12/12 709/224 |
| 8,571,578 B1 | 10/2013 | Chen et al. |
| 8,655,312 B2 | 2/2014 | Stahlberg et al. |
| 8,750,267 B2 | 6/2014 | Aggarwal et al. |
| 8,805,403 B2 | 8/2014 | Curticapean et al. |
| 9,113,291 B2 | 8/2015 | Venkatraman et al. |
| 9,167,386 B2 | 10/2015 | Valaee et al. |
| 9,258,713 B2 | 2/2016 | Rangarajan et al. |
| 9,301,100 B1 | 3/2016 | Jampani et al. |
| 9,374,709 B2 | 6/2016 | Peirce et al. |
| 9,420,430 B2 | 8/2016 | Wuoti et al. |
| 9,466,881 B1 | 10/2016 | Berry et al. |
| 9,503,864 B1 | 11/2016 | Chao et al. |
| 9,544,798 B1 | 1/2017 | Ahmadzadeh et al. |
| 9,794,753 B1 | 10/2017 | Stitt et al. |
| 9,849,978 B1 | 12/2017 | Carmack et al. |
| 9,867,039 B2 | 1/2018 | Wang et al. |
| 9,886,850 B2 | 2/2018 | Benhammou |
| 10,149,159 B1 | 12/2018 | Perfitt |
| 10,382,890 B1 | 8/2019 | Stirling |
| 10,511,392 B2 | 12/2019 | Khalajmehrabadi et al. |
| 10,530,486 B2 | 1/2020 | Aoyama et al. |
| 10,531,423 B1 | 1/2020 | Hassan et al. |
| 10,841,746 B2 | 11/2020 | Eashwaramoorthy |
| 2005/0041634 A1 | 2/2005 | Aura |
| 2006/0240840 A1 | 10/2006 | Morgan et al. |
| 2007/0049323 A1 | 3/2007 | Wang et al. |
| 2009/0075630 A1 | 3/2009 | McLean |
| 2009/0088132 A1 | 4/2009 | Politowicz |
| 2010/0120422 A1 | 5/2010 | Cheung et al. |
| 2011/0009132 A1 | 1/2011 | Skarby et al. |
| 2011/0065450 A1 | 3/2011 | Kazmi |
| 2011/0131651 A1 | 6/2011 | Shanmugavadivel et al. |
| 2011/0154050 A1 | 6/2011 | Cordery et al. |
| 2012/0056785 A1 | 3/2012 | Jovicic et al. |
| 2013/0170378 A1 * | 7/2013 | Ray .................. G06Q 10/08 370/252 |
| 2013/0196684 A1 | 8/2013 | Dong |
| 2013/0252631 A1 | 9/2013 | Alizadeh-Shabdiz et al. |
| 2013/0303185 A1 | 11/2013 | Kim et al. |
| 2013/0310066 A1 | 11/2013 | Shu et al. |
| 2013/0310068 A1 | 11/2013 | Fischer et al. |
| 2013/0336138 A1 | 12/2013 | Venkatraman et al. |
| 2014/0130155 A1 | 5/2014 | An et al. |
| 2014/0150049 A1 | 5/2014 | Kwon et al. |
| 2014/0256348 A1 | 9/2014 | Wirola et al. |
| 2014/0259047 A1 | 9/2014 | Bakar et al. |
| 2014/0344946 A1 * | 11/2014 | Ward .................. H04W 12/12 726/26 |
| 2015/0050947 A1 * | 2/2015 | Wirola .................. H04W 64/00 455/456.1 |
| 2015/0065166 A1 | 3/2015 | Ward et al. |
| 2015/0172289 A1 * | 6/2015 | Kwon .................. H04W 12/12 726/3 |
| 2015/0215762 A1 | 7/2015 | Edge |
| 2015/0226858 A1 | 8/2015 | Leibner et al. |
| 2015/0247916 A1 | 9/2015 | Bartov et al. |
| 2015/0257179 A1 | 9/2015 | Kim et al. |
| 2015/0334676 A1 | 11/2015 | Hart et al. |
| 2015/0351017 A1 | 12/2015 | Wirola et al. |
| 2015/0381740 A1 | 12/2015 | Gwin et al. |
| 2016/0054427 A1 | 2/2016 | Wirola et al. |
| 2016/0066154 A1 | 3/2016 | Shin |
| 2016/0094947 A1 | 3/2016 | Shen et al. |
| 2016/0192136 A1 * | 6/2016 | Pan .................. H04W 64/006 455/456.1 |
| 2016/0260059 A1 | 9/2016 | Benjamin et al. |
| 2016/0374046 A1 | 12/2016 | Wirola et al. |
| 2017/0026806 A1 | 1/2017 | Jalipani et al. |
| 2017/0068902 A1 * | 3/2017 | Kirshner ............... G06N 20/10 |
| 2017/0078851 A1 | 3/2017 | Agrawal et al. |
| 2017/0103489 A1 | 4/2017 | Asad et al. |
| 2017/0142684 A1 | 5/2017 | Bhatt et al. |
| 2017/0160375 A1 | 6/2017 | Syrjarinne et al. |
| 2017/0238146 A1 | 8/2017 | Kulig et al. |
| 2017/0311165 A1 | 10/2017 | Kang et al. |
| 2017/0325070 A1 | 11/2017 | Wirola et al. |
| 2017/0343639 A1 | 11/2017 | Ivanov et al. |
| 2017/0343640 A1 | 11/2017 | Khan et al. |
| 2018/0007067 A1 | 1/2018 | Kaushik |
| 2018/0067187 A1 | 3/2018 | Oh et al. |
| 2018/0070239 A1 | 3/2018 | Norrman et al. |
| 2018/0113189 A1 | 4/2018 | Khan et al. |
| 2018/0123708 A1 | 5/2018 | Khalajmehrabadi et al. |
| 2018/0188348 A1 | 7/2018 | Wirola et al. |
| 2018/0219869 A1 | 8/2018 | Kumar et al. |
| 2018/0255430 A1 | 9/2018 | Ivanov et al. |
| 2018/0279067 A1 | 9/2018 | Ivanov et al. |
| 2018/0332558 A1 | 11/2018 | Chan et al. |
| 2018/0352585 A1 | 12/2018 | Yang et al. |
| 2019/0036951 A1 * | 1/2019 | Kim .................. H04W 12/122 |
| 2019/0150001 A1 * | 5/2019 | Jen .................. H04L 41/0886 455/446 |
| 2019/0174452 A1 * | 6/2019 | Lev .................. H04W 24/08 |
| 2020/0015096 A1 | 1/2020 | Wirola et al. |
| 2020/0112570 A1 | 4/2020 | Yang et al. |
| 2020/0200856 A1 | 6/2020 | Wirola et al. |
| 2020/0200857 A1 | 6/2020 | Wirola et al. |
| 2020/0200858 A1 | 6/2020 | Wirola et al. |
| 2020/0200859 A1 | 6/2020 | Wirola et al. |
| 2020/0200864 A1 | 6/2020 | Wirola et al. |
| 2020/0204988 A1 | 6/2020 | Wirola et al. |
| 2020/0205004 A1 | 6/2020 | Wirola et al. |
| 2020/0205005 A1 | 6/2020 | Wirola et al. |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Extended European Search Report for Application No. EP 18 21 4705 dated Jul. 5, 2019, 8 pages.

Extended European Search Report for Application No. EP 18 21 4688 dated Jul. 9, 2019, 6 pages.

Extended European Search Report for Application No. EP 18 21 4718 dated Jun. 17, 2019, 9 pages.

Extended European Search Report for Application No. EP 18 21 4720 dated Jul. 15, 2019, 8 page.

Extended European Search Report for Application No. EP 18 21 4694 dated Jul. 5, 2019, 6 pages.

Extended European Search Report for Application No. EP 18 21 4724 dated Jul. 12, 2019, 9 pages.

U.S. Appl. No. 16/721,311, filed Dec. 19, 2019; In re: Wirola et al. entitled *Enabling Flexible Provision of Signature Data of Position Data Representing an Estimated Position*.

U.S. Appl. No. 16/723,451, filed Dec. 20, 2019; In re: Wirola et al. entitled *Service for Real-Time Spoofing/Jamming/Meaconing Warning*.

U.S. Appl. No. 16/723,572, filed Dec. 20, 2019; In re: Wirola et al. entitled *Statistical Analysis of Mismatched for Spoofing Detection*.

U.S. Appl. No. 16/723,620, filed Dec. 20, 2019; In re: Wirola et al. entitled *Crowd-Sourcing of Potentially Manipulated Radio Signals and/or Radio Signal Parameters*.

U.S. Appl. No. 16/723,721, filed Dec. 20, 2019; In re: Wirola et al., entitled *Identifying Potentially Manipulated Radio signals and/or Radion Signal Parameters Based on a First Radio Map Information and a Second Radio Map Information*.

U.S. Appl. No. 16/723,768, filed Dec. 20, 2019; In re: Wirola et al. entitled *Identifying Potentially Manipulated Radio signals and/or Radio Signal Parameters Based on Radio Map Information*.

(56) References Cited

OTHER PUBLICATIONS

U.S. Appl. No. 16/723,802, filed Dec. 20, 2019; In re: Wirola et al. entitled *Identifying Potentially Manipulated Radio Signals and/or Radio Signal Parameters*.

Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.

Android keystore system I Android Developers [online] [retrieved Feb. 17, 2020]. Retrieved via the Internet: https://web.archive.org/web/20181212204557/https://developer.android.com/training/articles/keystore (dated Dec. 12, 2018) 17 pages.

Subscriber Identity Module—Wikipedia [online] [retrieved Feb. 17, 2020]. Retrieved via the Internet: https://web.archive.org/web/20170923162233/https://fi.wikipedia.org/wiki/Subscriber_Identity_Module (dated Sep. 23, 2017) 2 pages.

Extensible Authentication Protocol—Wikipedia [online] [retrieved Feb. 17, 2020]. Retrieved via the Internet: https://web.archive.org/web/20171209152957/https://en.wikipedia.org/wiki/Extensible_Authentication_Protocol (dated Dec. 9, 2017) 10 pages.

Arkko, J. et al., *Extensible Authentication Protocol Method for 3rd Generation Authentication and Key Agreement (EAP-AKA)*, RFC4187 (Jan. 2006) 80 pages.

Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.

Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco.com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.

Office Action for U.S. Appl. No. 16/723,802 dated May 18, 2020.

GPS Spoofing a Growing Problem for Uber [online] [retrieved Feb. 17, 2020]. Retrieved via the Internet: https://soliddriver.com/GPS-Spoofing-A-Growing-Problem-for-Uber (dated Nov. 10, 2019) 4 pages.

Galileo Commercial service Implementing Decision enters into force Uber [online] [retrieved Feb. 17, 2020]. Retrieved via the Internet: https://www.gsa.europa.eu/newsroom/news/galileo-commercial-service-implementing-decision-enters-force (dated Feb. 10, 2017) 6 pages.

Extended European Search Report for Application No. EP 18 21 4716 dated Jul. 5, 2019, 6 pages.

Notice of Allowance for U.S. Appl. No. 16/723,721 dated Nov. 16, 2020.

Notice of Allowance for U.S. Appl. No. 16/723,802 dated Nov. 6, 2020.

Non-Final Office Action for U.S. Appl. No. 16/723,451 dated Nov. 23, 2020.

Final Office Action for U.S. Appl. No. 16/723,802 dated Sep. 2, 2020, 18 pages.

Office Action for U.S. Appl. No. 16/723,572 dated Jul. 7, 2020.

Office Action for U.S. Appl. No. 16/723,721 dated Jul. 1, 2020.

Extended European Search Report for Application No. EP 18214714.0 dated Jul. 5, 2019, 6 pages.

Office Action for European Application No. 18214716.5 dated Feb. 5, 2021, 5 pages.

Non-Final Office Action for U.S. Appl. No. 16/723,572 dated Mar. 22, 2021.

Non-Final Office Action for U.S. Appl. No. 16/723,620 dated Mar. 25, 2021.

Final Office Action for U.S. Appl. No. 16/723,451 dated May 3, 2021.

Non-Final Office Action for U.S. Appl. No. 16/723,768 dated Jun. 9, 2021.

Wirola et al., "Bandwidth and Storage Reduction of Radio Maps for Offline WLAN Positioning", 2013 International Conference on Indoor Positioning and Indoor Navigation, (Oct. 28-31, 2013), 9 pages.

Notice of Allowance for U.S. Appl. No. 16/723,572 dated Jul. 13, 2021.

Advisory Action for U.S. Appl. No. 16/723,451 dated Jul. 15, 2021.

Office Action for European Application No. 18214718.1 dated Jul. 14, 2021, 9 pages.

Office Action for European Application No. 18214724.9 dated Jun. 30, 2021, 8 pages.

Non-Final Office Action for U.S. Appl. No. 16/723,451 dated Sep. 7, 2021.

Office Action for European Application No. 18214688.6 dated Aug. 25, 2021, 4 pages.

Office Action for European Application No. 18214694.4 dated Aug. 27, 2021, 4 pages.

Final Office Action for U.S. Appl. No. 16/723,620 dated Sep. 29, 2021.

Final Office Action for U.S. Appl. No. 16/723,768 dated Nov. 1, 2021.

Notice of Allowance for U.S. Appl. No. 16/723,768 dated Nov. 22, 2021.

Advisory Action for U.S. Appl. No. 16/723,620 dated Dec. 10, 2021.

Final Office Action for U.S. Appl. No. 16/723,572 dated Dec. 8, 2020.

Non-Final Office Action for U.S. Appl. No. 16/721,311 dated Feb. 16, 2022.

Notice of Allowance for U.S. Appl. No. 16/723,620 dated Feb. 24, 2022.

Final Office Action for U.S. Appl. No. 16/723,451 dated Jan. 24, 2022.

Advisory Action for U.S. Appl. No. 16/723,451 dated Apr. 7, 2022.

Office Action for European Application No. 18214721.5 dated May 4, 2022, 6 pages.

Office Action for European Application No. 18214720.7 dated May 4, 2022, 5 pages.

* cited by examiner

DEVICE-CENTRIC LEARNING OF MANIPULATED POSITIONING

CROSS-REFERENCE TO RELATED APPLICATIONS

This application claims priority to European Application No. 18214716.5, filed Dec. 20, 2018, the entire contents of which are incorporated herein by reference.

FIELD

The invention relates to the field of non-GNSS based radio positioning and more specifically to identifying potentially manipulated radio signals and/or radio signal parameters.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems. WLAN based positioning systems typically use the WLAN infrastructure "as is", i.e. they do not typically require installation of additional access points or reconfiguration of the existing network unless the geometry of the access points is exceptionally unfavorable for the positioning purposes.

Such a non-GNSS based radio positioning system (e.g. a self-contained positioning system) may be divided in at least three stages: an installation stage, a training stage and a positioning stage.

In the installation stage, dedicated positioning support radio nodes (e.g. Bluetooth beacons) may be installed in the environment for which a positioning system is to be provided. Alternatively or additionally, a non-GNSS based radio positioning system may make use of existing radio nodes like WLAN access points or cellular network nodes as positioning support radio nodes.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio nodes (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EXEMPLARY EMBODIMENTS

Non GNSS-based radio positioning systems (e.g. Bluetooth, WLAN and cellular based radio positioning systems) as disclosed above may be affected by manipulating radio signals that are used for positioning purposes during the positioning stage.

Manipulation techniques may for example be spoofing or jamming of such radio signals:
  Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.
  Jamming of radio signals may be considered to relate a deliberate attempt to disrupt detecting one or more radio signals by a mobile device, for example by transmitting radio signals and/or radio noise interfering the one or more radio signals.

Jamming of radio signals may also occur unintentionally by signals from near-by radios sources, which may for instance mix in a receiver's radio frequency front-end into in-band interference.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

According to a first exemplary aspect of the present invention, a method is disclosed, the method comprising:
maintaining a database comprising identifying information indicative of one or more radio nodes and/or of one or more areas within which the one or more radio nodes are located, wherein each respective radio node of the one or more radio nodes is configured to enable positioning based on radio signals sent by the respective radio node, wherein said positioning enabled by the respective radio node is considered to be at least partially unexpected.

This method may for instance be performed and/or controlled by an apparatus, for instance mobile device, e.g. a mobile terminal. For instance, the method may be performed and/or controlled by using at least one processor of the mobile device.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:
an apparatus according to any aspect of the invention as disclosed above, and a server, wherein the server is configured to provide one or more pieces of identifying information to the apparatus.

In the following, exemplary features and exemplary embodiments of all aspects of the present invention will be described in further detail.

The mobile device may be an Internet-of-Thing (IoT) device, a smart home device, a smartphone, a tablet computer, a notebook computer, a smart watch, and a smart band.

For example, the disclosed method may be part of a non-GNSS based radio positioning system as disclosed above. The mobile device may be enabled for or support such a non-GNSS based radio positioning system. This may be understood to mean that the mobile device is configured to estimate (e.g. determine) or to cause estimating (e.g. determining) its position at least partially based on radio signal parameters of one or more radio signals (e.g. one or more terrestrial radio signals) obtained at this position (e.g. obtained as a scanning result of scanning for observable radio signals at this position). Estimating (e.g. determining) of a position of the mobile device at least partially based on (a) radio signal parameter(s) may be understood to mean that the estimating is performed as a function of the radio signal parameter(s). It is however to be understood that the estimating may optionally depend on further information like a radio map. For example, such a radio map may be configured to enable mobile devices to estimate their position at least partially based on this radio map when the mobile devices are located in the area covered by the radio map. For example, the radio map is represented by radio map information which may be provided (e.g. transmitted) by a positioning server to the mobile device and/or which may be hold available by the mobile device (e.g. stored in memory means of the mobile device(s)). For example, the radio map contains or represents a respective radio model for a plurality of radio nodes transmitting (e.g. broadcasting) radio signals that are observable within the area covered by the radio map. If the radio map covers a venue (e.g. building), the radio map may contain or represent, for each floor of the venue, a respective radio model for a plurality of radio nodes transmitting (e.g. broadcasting) radio signals that are observable on the respective floor of the venue.

A respective radio model for a respective radio node of the plurality of radio nodes may be understood to represent at least the expected radio coverage of the respective radio node (e.g. on a certain floor of a building). For example, the radio model of such a radio node may describe the coverage area (e.g. on a certain floor of a venue) within which radio signals transmitted or triggered to be transmitted by this radio node are expected to be observable. An example for such a radio model is a radio image representing an expected radio signal strength field of the radio signals transmitted or triggered to be transmitted by this radio node. The real radio coverage of such a radio positioning support device may however deviate from the expected radio coverage as described by such a radio model. As disclosed above, the radio map may be determined by the positioning server during the training stage of the non-GNSS based radio positioning system. Causing of estimating (e.g. determining) of a position of a mobile device at least partially based on the radio signal parameter(s) may be understood to mean that the radio signal parameter(s) are provided (e.g. transmitted) by the mobile device to the positioning server to cause the positioning server to estimate (e.g. determine) a position of the mobile device at least partially based on the radio signal parameter(s).

The one or more radio signals may be terrestrial radio signals. Examples of such a terrestrial radio signal are a Bluetooth signal, a Bluetooth Low Energy (BLE) signal, a cellular network signal or a Wireless Local Area Network (WLAN) signal. The Bluetooth standards are specified by the Bluetooth Special Interest Group and are presently available under https://www.bluetooth.com/. A cellular network may for example be mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information contained in the radio signal and (2) a representation (e.g. an indicator or a value) of a physical quantity (e.g. a received signal strength) of the radio signal. Accordingly, a radio signal parameter may be determined by at least one of (1) extracting information contained in the radio signal and (2) measuring a physical quantity (e.g. a received signal strength) of the radio signal.

For example, the mobile device may scan for observable radio signals at a first position and a second position for estimating its position (e.g. based on a non-GNSS based radio positioning system as disclosed above). One or more first radio signal parameters and one or more second radio signal parameters may then be obtained as scanning results. As discussed above, a spoofing malware running on the mobile device may falsify such scanning results.

If spoofing occurs, the one or more radio signals and/or the first radio signal parameters and second radio signal parameters may behave in an unexpected way and, thus, the second radio signal parameters may be determined to be unexpected for the second position of the mobile device. For example, if a malware running on the mobile device falsifies the scanning results, a representation of a certain physical quantity of the one or more radio signals may not change when the mobile device moves from the first position to the second position. Accordingly, if it is determined that the second radio signal parameters are unexpected for the second position of the mobile device, the one or more radio signals and/or the first radio signal parameters and the second radio signal parameters may be considered to be potentially manipulated. The disclosed method allows maintaining a database comprising such identified potentially manipulated radio signals and/or radio signal parameters and/or radio nodes and/or areas within which such potentially manipulated radio signals and/or radio signal parameter are propagated and/or such (a) radio(s) are located and, thus, to mitigate threats associated with manipulation techniques like spoofing, meaconing and jamming.

The database may for instance be maintained in a memory. Such a memory may for instance be comprised by or be connectable to the at least one mobile device performing and/or controlling the method according to the first exemplary aspect of the present invention. The maintaining of the database may for instance be referred to as keeping the database. The database may for instance be available upon a certain request so that e.g. independent upon a communication connection information of the database can be retrieved to be further utilized, e.g. for determining a position of the at least one apparatus performing and/or controlling the method according to the first exemplary aspect of the present invention.

Thus, the disclosed method according to the first exemplary aspect of the present invention further allows to keep track of one or more radio nodes and/or one or more areas within which the one or more radio nodes are located, wherein those one or more radio nodes are considered to be under at least one of spoofing, jamming and meaconing influence. Those one or more radio nodes are considered to propagate potentially manipulated radio signals and/or radio signal parameters which influence the result of a position. In order to avoid such potentially manipulated positions to be determined based on the radio signals of the one or more radio nodes, one or more further actions may be performed to counter them. More details are presented in the following of this description.

Such an area of the one or more areas may for instance be a geographical area (e.g. a two dimension polygon), a venue or its section, a floor or its section, or a combination thereof. In case the area represents a venue or its section, and/or a floor or its section, one or more radio nodes may for instance be installed in the venue or its section, and/or in the floor or its section.

Such a radio node may be a specific WiFi, Bluetooth, cellular, or a combination thereof enabled radio node. For instance, a specific radio node of the one or more radio node may for instance be identified by its identifier (ID). Thus, the identifier of at least one radio node of the one or more radio nodes may for instance be stored in the database to identify the respective radio node. Further, based on a respective identifier, for instance, the location of the respective radio node may for instance be determined. To name but one non-limiting example, the respective identifier may be associated with its current location (e.g. in the form of coordinates; x- and y-coordinates or latitude- and longitude-coordinates) so that the location of the respective radio node is at least determinable at least partially based on its identifier.

Such (a) radio node(s) of the one or more radio nodes may for instance be used for indoor positioning and/or floor detection, e.g. according to BT—(Bluetooth) and/or BLE—(Bluetooth Low Energy) specification, or may for instance be a Wi-Fi Access Point for indoor positioning and/or floor detection, e.g. according to the WLAN—(Wireless Local Area Network) specification).

Such (a) radio node(s) of the one or more radio devices, e.g. of a certain venue or its section, and/or of a certain floor or its section, may for instance comprise or be connectable to a transceiver, e.g. according to the BT-, BLE, and/or WLAN-specification to provide wireless-based communication. Each radio node of the one or more radio nodes may for instance use such a transceiver for transmitting and/or broadcasting one or more radio signals, e.g. comprising or containing one or more information and/or potentially manipulated radio signals and/or radio signal parameters.

In case such (a) radio node(s) transmits potentially manipulated radio signals and/or radio signal parameters, it is referred to such (a) radio node(s) herein as affected radio node(s).

In case the potentially affected radio node(s) are identified (e.g. based on its respective identifier as comprised by the maintained database), an action may be taken when e.g. the mobile device performing and/or controlling the method according to the first exemplary aspect of the present invention is located (or e.g. arriving) again in the affected area within which the affected radio node is located, or when detecting a radio node, which has previously been detected to be spoofed. The action may enable the prevention of a position to be determined (e.g. estimated) which is at least partially based on the radio signal(s) or radio signal parameter(s) of the affected radio node.

As disclosed above, potentially manipulated radio signals and/or radio signal parameters may be used for spoofing, jamming, meaconing, or a combination thereof. Thus, once spoofing, jamming, meaconing, or a combination has been detected, maintaining a database of those attempts can be achieved. Such a database may for instance be stored in a memory of the respective apparatus (e.g. a mobile device), e.g. in the apparatus' non-volatile memory.

The database may for instance be a (e.g. simple) geospatial database. When maintaining (e.g. comprising a storing or an updating an existing database) with data for the radio nodes and/or the one or more (e.g. geographical) areas, for instance, the Earth surface may for instance be divided into a multi-scale grid (geospatial index) that allows associating data structures with each of the respective geographical areas. Further, such data may be associated with each of the respective geographical areas and/or with at least one of the one or more radio nodes stored in the database at varying spatial resolution. In this way, the storage needed by the database may for instance be optimized.

According to an exemplary embodiment of all aspects of the present invention, a respective area of the one or more areas is one of the following:
i) a geographical area (e.g. 2D polygon);
ii) a venue or a section of the venue; or
iii) a floor or a section of the floor.

A geographical area may for instance be represented by a map or a section of a respective map. Such a geographical area may for instance be represented by a two-dimensional (2D) polygon. Such a 2D-polygon, as used herein, may be understood as a closed form of multiple edges being connected to each other with boundaries in straight lines. The venue may for instance be a building, shopping mall, office complex, public accessible location (e.g. station, airport, university or the like), to name but a few non-limiting examples. Thus, a section of a respective venue is at least one part that is comprised by the entire venue. Further, a floor may for instance be such a part of the venue. Correspondingly, a part of a floor is at least a part that is comprised by the entire floor.

According to an exemplary embodiment of all aspects of the present invention, the database further comprises a radio-type information associated with the one or more radio nodes and/or the one or more areas.

Identifying of radio signals and/or radio signal parameters as potentially manipulated may allow the mobile device and/or other devices to recognize radio signals and/or radio signal parameters which have already been considered as potentially manipulated before. For example, the mobile device or the remote device may maintain a database (e.g. a black list) for storing (e.g. collecting) manipulation information identifying radio signals and/or radio signal parameters as potentially manipulated.

In the database, a respective radio node of the one or more radio nodes and/or a respective area of the one or more areas (and e.g. comprising at least one affect radio node) may further be associated with (e.g. linked to) a radio-type information. Such a radio-type information may for instance be indicative of that a specific type of radio (e.g. WiFi, Bluetooth, cellular, or a combination thereof) is under influence.

For instance, in the maintained database, a respective identifier of a certain radio node may for instance be associated with (e.g. linked to) one or more further pieces of information, e.g. wherein such an information may for instance be a radio-type information.

Furthermore, such a radio-type information associated with at least one radio node of the one or more radio nodes and/or with at least one area of the one or more areas may be used to filter (all of) the other radio node(s) and/or area(s) comprised in the database. For instance, in case a certain radio node is affected, at least partially based on the associated radio-type information, it may for instance be enabled to identify (e.g. all of) the other radio node(s) using the same radio-type, so that e.g. those further identified radio nodes may be basis for a check, or be excluded when determining of a position is performed, to name but a few non-limiting examples.

According to an exemplary embodiment of all aspects of the present invention, the radio-type information is indicative of one of the following types:
i) a cellular-based type;
ii) a WiFi-based type;
iii) a Bluetooth-, in particular Bluetooth Low Energy-based type; or
iv) a wireless LPWAN (Low Power Wide Area Network)-based type.

Thus, at least partially on the radio-type information, at least one of the following radio signals may for instance be identified to be potentially manipulated:
a Bluetooth radio signal (e.g. a Bluetooth Low Energy (BLE) radio signal);
a LPWAN radio signal; —a WLAN radio signal; and
a cellular radio signal.

Accordingly, one or more respective radio nodes of the one or more radio nodes transmitting (e.g. broadcasting) the one or more radio signals (e.g. Bluetooth radio signal(s), WLAN radio signal(s), cellular radio signal(s)) may for instance be determined to be at least one of the following types of radio nodes:
a Bluetooth beacon (e.g. a Bluetooth beacon enabling Bluetooth low energy mode or a Bluetooth low energy beacon);
a base station of a wireless LPWAN;
an access point of a WLAN; and
a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver of a respective (communication) interface. The Bluetooth and/or BLE radio interface may be configured to transmit Bluetooth and or BLE radio signals. A Bluetooth beacon that is employed for the invention may be any kind of Bluetooth beacon complying with any present or future standard.

Such Bluetooth beacons may be easily installed as dedicated position support radio nodes at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of e.g. 2 to 3 meters as well as a high reliability in floor detection may be achieved. The Bluetooth beacons may be stand-alone devices or be integrated into or attached to some other device. Bluetooth beacons, in particular in low energy mode (BLE), require comparably little energy and the use of Bluetooth low energy may enable a positioning with limited energy consumption at all involved devices.

It is to be understood, however, that other types of radio nodes than variations of Bluetooth beacons may be used as well as dedicated position support radio nodes, for instance tags or other devices that are configured to transmit ultra-wideband (UWB) signals or any wireless radio signals that might emerge in the future.

As disclosed above, existing radio nodes like WLAN access points or cellular network nodes may be used as positioning support radio nodes alternatively or additionally.

A WLAN access point may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal.

A base station of a (wireless) LPWAN may for instance enable one or more mobile devices to join (e.g. connect) to the base station. A base station of such a LPWAN may for instance be suitable for outdoor and/or indoor environments. A base station of a LPWAN may for instance enable a wireless communication network according to Sigfox, LoRa (Long Range), and NB-IoT (Narrow Band-Internet of Things) specification, to name but a few non-limiting examples.

Furthermore, such a radio-type information associated with at least one radio node of the one or more radio nodes and/or with at least one area of the one or more areas may be used to filter (e.g. all of) the other radio node(s) and/or area(s) comprised in the database.

According to an exemplary embodiment of all aspects of the present invention, the database further comprises a frequency-band information associated with the one or more radio nodes and/or the one or more areas.

Such a frequency-based information may for instance be indicative of a specific frequency-band that is considered to be under influence. Further, it will be understood that a respective frequency-band information may for instance be associated with a certain radio-type information. Thus, the frequency-band information may for instance represent a specific spectrum (also referred to as frequency-bank in the following of this description) that is considered to be under influence. In conjunction with a certain radio-type information, it may for instance further be specified which radio-type transmits (a) radio signal(s) and/or (a) radio signal parameter(s) using the spectrum of the frequency-band information.

According to an exemplary embodiment of all aspects of the present invention, the frequency-band information is indicative of one of the following frequency bands:
short-range frequency-band;
long-range frequency-band.

For instance, a respective frequency band information may represent a 2.4 GHz or 5 GHz spectrum, and a respective radio-type information may represent WiFi Radio. Thus, e.g. radio signals and/or radio signal parameters transmitted by WiFi access points using the 2.4 GHz spectrum can be considered to be under the influence, in case this information is represented by the database accordingly, to name but one non-limiting example.

For instance, in the maintained database, a respective identifier of a certain radio node may for instance be associated with (e.g. linked to) one or more further pieces of information, e.g. wherein such an information may for instance be a frequency-band information.

According to an exemplary embodiment of all aspects of the present invention, the database further comprises an influence information associated with the one or more radio nodes and/or the one or more areas, wherein the influence information represents that the positioning enabled by the respective radio node of the one or more radio nodes and/or within the respective area of the one or more areas is considered to be potentially manipulated, in particular that a position estimated by said positioning is considered to be unexpected.

Such an influence information may for instance be associated with (e.g. linked to) a certain radio node of the one or more radio nodes and/or to a certain area of the one or more areas that are maintained (e.g. kept, or stored) in the database.

For instance, in the maintained database, a respective identifier of a certain radio node may for instance be associated with (e.g. linked to) one or more further pieces of information, e.g. wherein such an information may for instance be an influence information.

According to an exemplary embodiment of all aspects of the present invention, each respective radio node of the one or more radio nodes and/or of the one or more areas is associated with a respective identifier enabling identification of the respective radio node.

A respective identifier may for instance be a radio signal parameter of a certain radio signal contained or comprised in the radio signal. A respective identifier may for instance be a representation (e.g. an indicator or a value) of a physical quantity (e.g. a received signal strengths) of the radio signal. Accordingly, a respective identifier may be determined by at least one of (1) extracting information contained or comprised in the radio signal and (2) measuring a physical quantity (e.g. a received signal strength) of the radio signal.

Further, the respective identifier may for instance be used to determine the location of at least one radio node of the one or more radio nodes, and/or of at least area of the one or more areas. The database may for instance comprise an association or a link to retrieve the location of the at least one radio node of the one or more radio nodes and/or of the one or more areas based at least partially on the respective identifier.

In this way, it is enabled to determine the one or more radio nodes and/or the one or more areas based at least partially on such a respective identifier.

According to an exemplary embodiment of all aspects of the present invention, in case positioning is considered to be unexpected in case the positioning enabled is considered to be spoofed, jammed, meaconed, or a combination thereof, the method further comprises:

identifying at least one affected radio node and/or at least one affected radio node that is located within a respective area.

Non GNSS-based radio positioning systems may be affected by manipulating radio signals that are used for positioning purposes during the positioning stage. Manipulation techniques may for example be spoofing or jamming of such radio signals. For example, an attacker may install a spoofing radio node in a certain area to deceive one or more mobile devices to cause them to determine to be located within the overlapping region of the coverage areas described by the radio models of one or more radio nodes (e.g. BLE beacons, and/or WiFi access points). The spoofing radio node may be configured to (e.g. automatically and/or repeatedly) transmit spoofed e.g. BLE and/or WiFi radio signals containing or representing the respective identifier (e.g. UUIDs of BLE beacons, and/or SSIDs of WiFi access points). If the at least one mobile devices determines their position at least partially based on radio signal parameters of these spoofed radio signals, they may determine (e.g. estimate) their position to be within the overlapping region of the (e.g. coverage) areas described by the radio models of the respective radio node(s).

In case such an unexpected position is identified (e.g. determined), the one or more radio nodes that were used for determining the position estimate may for instance be considered to be under influence. In order to identify the specific affected radio node, for instance one or more comparisons between several determinations of position estimates and the respectively involved radio nodes may for instance be performed so that the affected radio node can be identified. Then, e.g. the respective identifier of the affected radio node may for instance be maintained in the database.

It will be understood that a respective area of the one or more area may for instance be identifiable by a respective area identifier. Further, such an area identifier may for instance enable to determine e.g. the size and the form (e.g. geographical area) of the respective area.

According to an exemplary embodiment of all aspects of the present invention, the method further comprises one or more of the following actions i) to iii):
i) blocking the at least one affected radio node from being utilized for a positioning;
ii) blocking a frequency-band associated with the at least one affected radio node from being utilized for a positioning based at least partially on the frequency-band information associated with the at least one affected radio node; and
iii) blocking a radio type associated with the at least one affected radio node from being utilized for a positioning based at least partially on the radio-type information associated with the at least one affected radio node.

The at least one affected radio node may for instance be identified based on an identifier information of the at least one affected radio node. Then, in case one or more radio signals and/or one or more radio signal parameters are intended to be used when determining a position estimate by a respective mobile device, at least one of the action i) to iii) can be performed to avoid a fraudulent position estimate to be determined.

According to an exemplary embodiment of all aspects of the present invention, each respective radio node of the one or more radio nodes and/or of the one or more radio nodes located within the one or more areas that is equal to a corresponding frequency-band information and/or radio-type information to the blocked frequency-band information and/or radio-type is identified as a further affected radio node, wherein the respective further affected radio node is blocked from being utilized for a positioning.

For instance, the at least one affected radio node can be blocked according to action i). Then, simply all of the radio signals and/or radio signal parameters that stem from this affected radio node are ignored when the position estimate is determined. As described above, further according action ii) or iii), a certain frequency spectrum can be blocked based on the respective frequency-band information, or a certain type of radio nodes can be blocked based on the respective radio-type information.

According to an exemplary embodiment of all aspects of the present invention, the method further comprises:
determining a warning information indicative of the at least one affected radio node that is potentially manipulated; and
outputting the warning information enabling one or more other mobile devices to increase their sensitivity level of detection of spoofing, jamming, meaconing, or a combination thereof.

Such a warning information indicative of the at least one affected radio node that is potentially manipulated may for instance be determined. After the determining of the warning information, the warning information is output, which may for instance enable one or more other mobile devices to increase their sensitivity level of detection of spoofing, jamming, meaconing, or a combination thereof.

According to an exemplary embodiment of all aspects of the present invention, the warning information comprises one or more of the following information i) to iv) in case they are associated with the at least one affected radio node:
i) identifier of the at least one affected radio node;
ii) frequency-band information associated with the at least one affected radio node;
iii) radio-type information associated with the at least one affected radio node; and
iv) the respective area in which the at least one affected radio node is located.

According to an exemplary embodiment of all aspects of the present invention, the method further comprises:
obtaining a corresponding warning information output by a mobile device that is different from the at least one mobile device; and utilizing the obtained warning information to maintain the database.

The warning information may for instance be obtained by receiving the warning information, e.g. from a server, or from an entity that is different from the server that relays the warning information to the at least one mobile device. The warning information may for instance be obtained by a push- or a pull-method. The push-method enables the warning information to be pushed onto the at least one mobile device by another mobile device. The pull-method enables the at least one mobile device to (e.g. actively) retrieve the warning information from another mobile device, e.g. by sending a request for obtaining the warning information. Then, the obtained warning information may for instance be utilized (e.g. used) to maintain (e.g. updated) the database at least partially based on the warning information.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
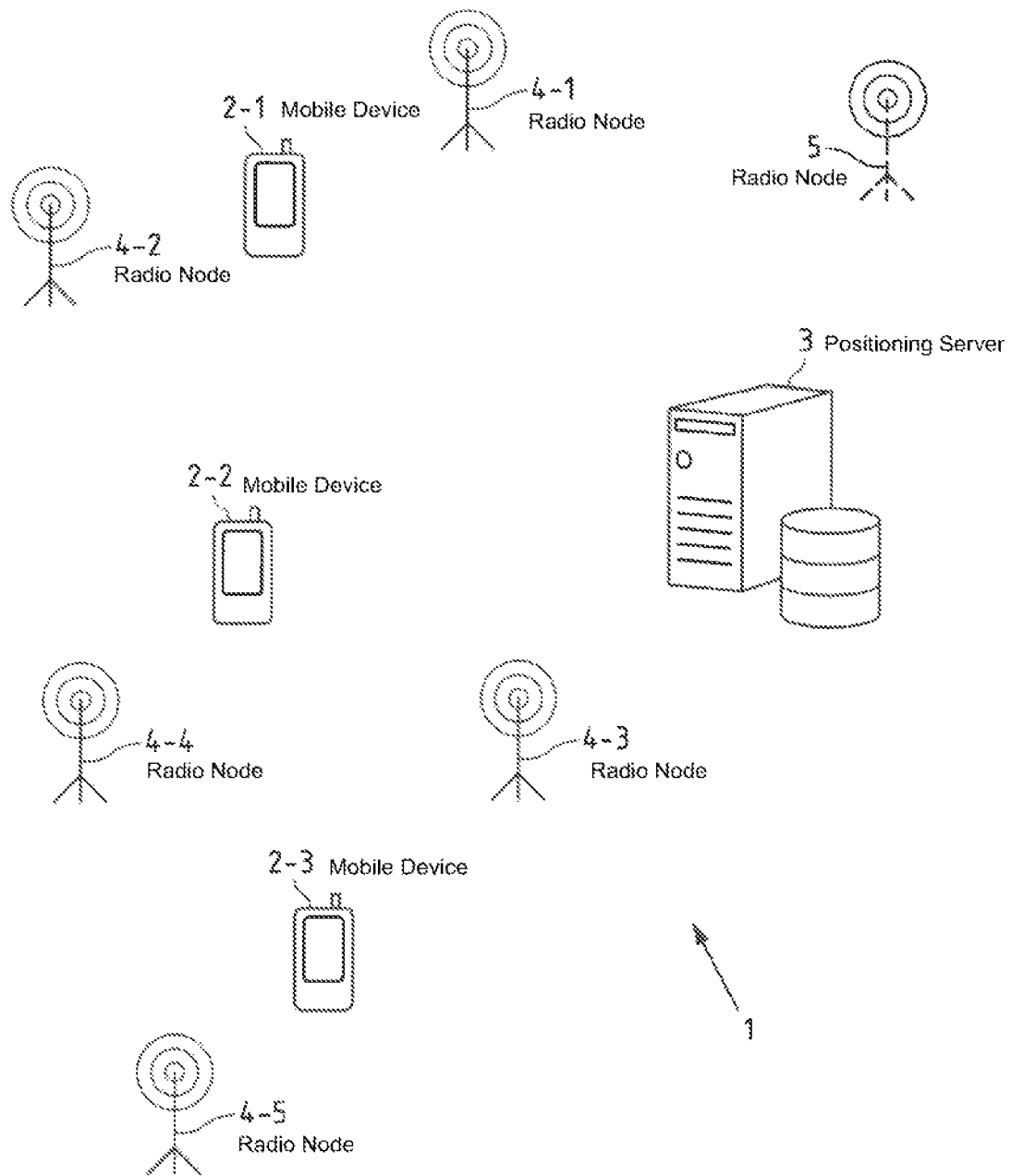
FIG. 1 is a block diagram of an exemplary embodiment of a system according to the present invention.

FIG. 1 is a schematic high-level block diagram of a system 1 according to an exemplary aspect of the present invention. In the following, it is assumed that system 1 is a non-GNSS based radio positioning system for a predetermined environment like a venue (e.g. building or a complex of buildings, such as a shopping center, a parking garage, an airport, a company site, etc.).

For example, each of mobile devices 2-1 to 2-3 may be one of a smartphone, a tablet computer, a notebook computer, a smart watch, a smart band, and an IoT device. Mobile devices 2-1 to 2-3 may be enabled for or support non-GNSS based radio positioning system 1.

System 1 comprises an affected (e.g. spoofed) radio node 5, which may for instance be installed by a fraudulent third party in the venue. Thus, this radio node 5 may for instance employ a manipulation technique like spoofing, jamming and/or meaconing in the venue so that position estimates determined in the venue under consideration of radio signals and/or radio signal parameters of this radio node 5 comprise or represent a false position.

System 1 comprises a positioning server 3 and a plurality of optional radio nodes 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio nodes 4-1 to 4-5 are dedicated position support radio nodes in the form of BLE beacons 4-1 to 4-5 fixedly installed in the predetermined environment of system 1. However, system 1 may comprise further radio nodes or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio nodes 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio nodes 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to determine (e.g. estimate) their position at least partially based on this radio map when the mobile devices are located within the predetermined environment of system 1 (i.e. the area covered by the radio map). For example, the radio map is represented by radio map information which may be provided (e.g. transmitted) by a positioning server 1 to mobile devices 2-1 to 2-3 and/or which may be hold available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio node. For example, the radio model of such a BLE beacon may at least describe the coverage area within which radio signals transmitted by this radio node are expected to be observable.

In the positioning stage, mobile devices 2-1 to 2-3 may use the radio map to determine (e.g. estimate) their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, non GNSS-based radio positioning systems like system 1 may be affected by manipulating radio signals that are used for positioning purposes during the positioning stage. Manipulation techniques may for example be spoofing or jamming of such radio signals as described above in more detail. For example, an attacker may install the affected (e.g. spoofed) radio node 5 in a certain area to deceive mobile devices 2-1 to 2-3 to cause them to determine to be located within the overlapping region of the coverage areas described by the radio models of BLE beacons 4-1, 4-2 an 4-3. The spoofing radio node 5 may be configured to (e.g. automatically and/or repeatedly) transmit spoofed BLE radio signals containing or representing the UUIDs of BLE beacons 4-1, 4-2 and 4-3. If mobile devices 2-1 to 2-3 determine (e.g. estimate) their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

Example embodiments according to all aspects of the present invention enable the mobile devices 2-1 to 2-3 to maintain a database comprising identifying information indicative of one or more radio nodes (e.g. the radio node 5) and/or of one or more areas within which the one or more radio nodes (e.g. the radio node 5) are located, wherein each respective radio node of the one or more radio nodes is configured to enable positioning based on radio signals sent by the respective radio node, wherein said positioning enabled by the respective radio node is considered to be at least partially unexpected. This database may for instance be used by each respective mobile device of the mobile devices 2-1 to 2-3 when determining (e.g. estimating) a position so that e.g. spoofed BLE beacons (e.g. radio node 5 of all radio nodes 4-1 to 4-5 and 5) may for instance be blocked so that the respective blocked BLE beacon(s) may for instance be not considered for determining (e.g. estimating) the positon of the respective mobile device.

Figure 2A:
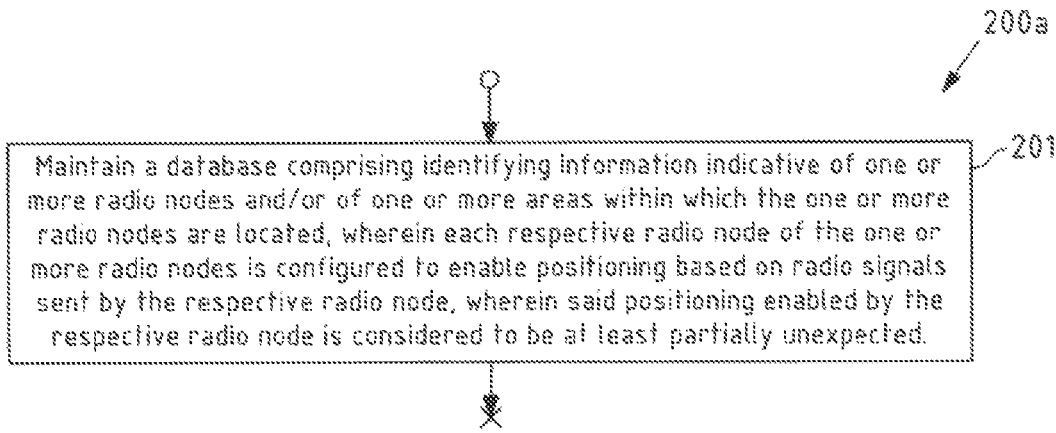
FIG. 2a-e is a flow chart illustrating an exemplary embodiment of a method according to the present invention.

FIG. 2a is a flowchart 200a showing an example embodiment of a method according to the first exemplary aspect of the present invention. This flowchart 200a may for instance be performed by a mobile device, e.g. a mobile terminal. This flowchart 200a may for instance be performed by at least one of the mobile devices 2-1 to 2-3 of FIG. 1.

In a first step 201, a database is maintained. The database comprises identifying information indicative of one or more radio nodes and/or or one or more areas within which the one or more radio nodes are located. The database may for instance be stored in a memory. The memory may for instance be comprised by the mobile device (e.g. at least one of the mobile device 2-1 to 2-3 of FIG. 1) or alternatively, the memory may for instance be connectable to the mobile device. The database is utilized by the mobile device (e.g. at least one of the mobile device 2-1 to 2-3 of FIG. 1) when performing positioning since the identifying information of the database are indicative of one or more radio nodes and/or of one or more areas comprising radio nodes enabling positioning that is considered to be at least partially unexpected. Thus, a positioning utilizing such radio nodes (enabling positioning that is considered to be at least partially unexpected) can lead to e.g. spoofed, and/or fraudulent results. In an example embodiment of the present invention, the one or more radio nodes and/or the one or more areas within which the one or more radio nodes are located of the identifying information of the database are e.g. blocked from being utilizing when performing positioning (see steps 205 to 207 of flowchart 200d of FIG. 2d).

Figure 2B:
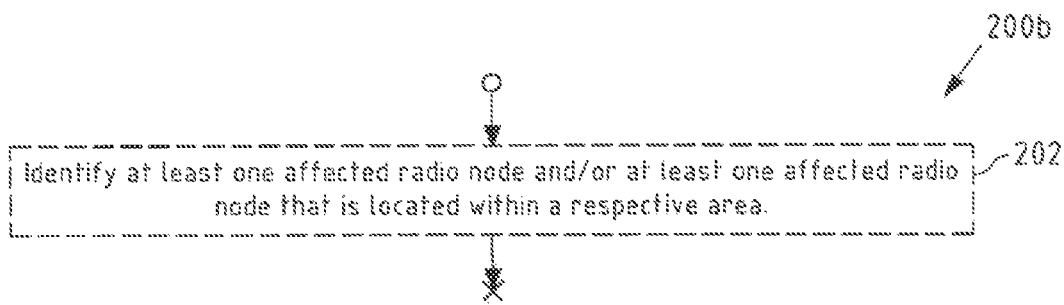

FIG. 2b is a flowchart 200b showing an example embodiment of a method according to the first exemplary aspect of the present invention. This flowchart 200b may for instance be performed by a mobile device, e.g. a mobile terminal. This flowchart 200b may for instance be performed by at least one of the mobile devices 2-1 to 2-3 of FIG. 1. The flowchart 200b may for instance be performed in addition to the flowchart 200a of FIG. 2a. The optional step 202 may for instance be performed in parallel or before or after step 201 of flowchart 200a of FIG. 2a.

In an optional step 202, at least one affected radio node and/or at least one affected radio node that is located within a respective area is identified.

Figure 2C:
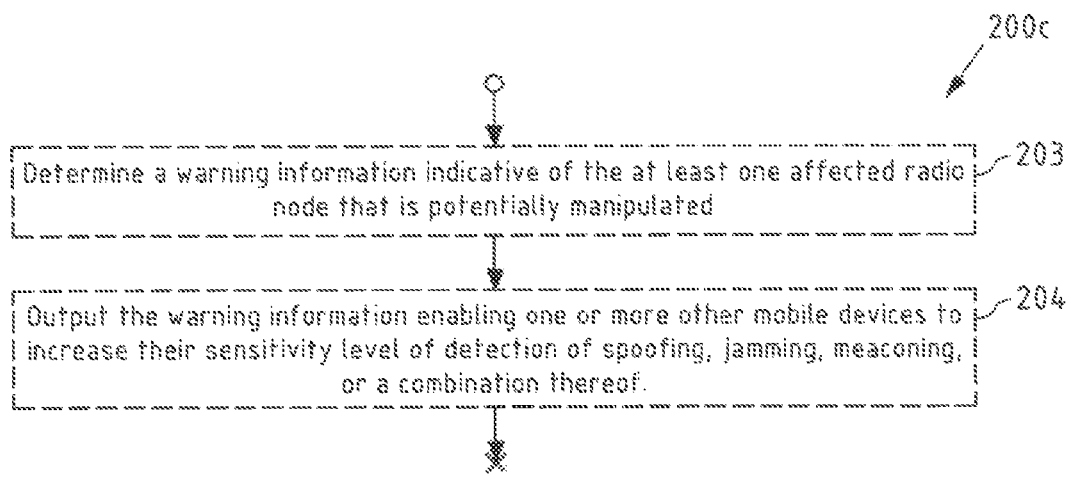

FIG. 2c is a flowchart 200c showing an example embodiment of a method according to the first exemplary aspect of the present invention. This flowchart 200c may for instance be performed by a mobile device, e.g. a mobile terminal. This flowchart 200c may for instance be performed by at least one of the mobile devices 2-1 to 2-3 of FIG. 1. The flowchart 200c may for instance be performed in addition to the flowchart 200a of FIG. 2a. Any of the optional steps 202 and 203 may for instance be performed in parallel or before or after step 201 of flowchart 200a of FIG. 2a.

In an optional step 203, a warning information indicative of the at least one affected radio node that is potentially manipulated is determined. After the determining of the warning information, in another optional step 204, the warning information enabling one or more other mobile devices to increase their sensitivity level of detection of spoofing, jamming, meaconing, or a combination thereof is output. The warning information may for instance be output to a server (e.g. server 3 of FIG. 1). Then, other mobile devices may for instance be provided with the warning information e.g. stored in a memory of the server, so that the other mobile devices can be aware of the at least one affected radio node. Additionally or alternatively, the warning information may for instance be output (e.g. directly) to at least one of the other mobile devices, wherein upon reception of the warning information, those other mobile device(s) may for instance updated their maintained database with the warning information.

Figure 2D:
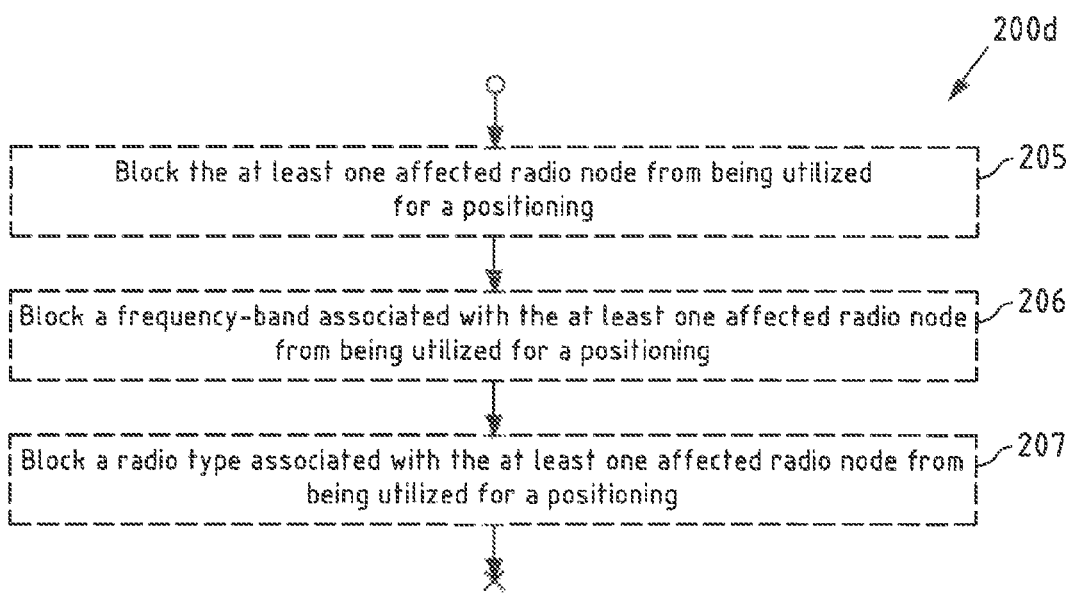

FIG. 2d is a flowchart 200d showing an example embodiment of a method according to the first exemplary aspect of the present invention. This flowchart 200d may for instance be performed by a mobile device, e.g. a mobile terminal. This flowchart 200d may for instance be performed by at least one of the mobile devices 2-1 to 2-3 of FIG. 1. The flowchart 200d may for instance be performed in addition to the flowchart 200a of FIG. 2a. Any of the optional steps 205 to 207 may for instance be performed in parallel or before or after step 201 of flowchart 200a of FIG. 2a.

In an optional step 205, the at least one affected radio node is blocked from being utilized for a positioning.

In an optional step 206, a frequency-band associated with the at least one affected radio node is blocked from being utilized for a positioning.

In an optional step 207, a radio type associated with the at least one affected radio node is blocked from being utilized for a positioning.

Figure 2E:
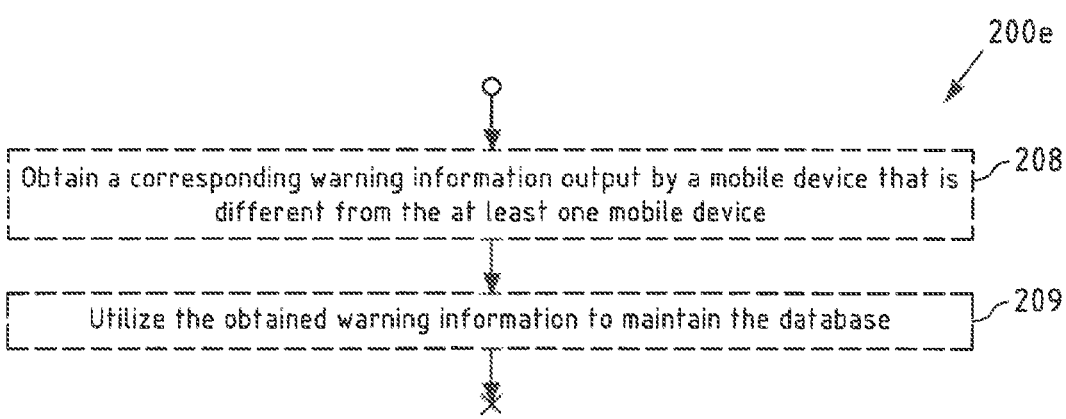

FIG. 2e is a flowchart 200e showing an example embodiment of a method according to the first exemplary aspect of the present invention. This flowchart 200e may for instance be performed by a mobile device, e.g. a mobile terminal. This flowchart 200e may for instance be performed by at least one of the mobile devices 2-1 to 2-3 of FIG. 1. The flowchart 200e may for instance be performed in addition to the flowchart 200a of FIG. 2a. Any of the optional steps 208 and 209 may for instance be performed in parallel or before or after step 201 of flowchart 200a of FIG. 2a.

In an optional step 208, a corresponding warning information output by at least one mobile device that is different from the mobile device performing an example embodiment (e.g. performing and/or controlling the flowchart 200a of FIG. 2a) of the method according to the first exemplary aspect of the present invention is obtained. The corresponding warning information may for instance be obtained (e.g. received) from a server having stored one or more of such corresponding warning information (e.g. server 3 of FIG. 1). Additionally or alternatively, the warning information may for instance be obtained (e.g. received) (e.g. directly) from another mobile device (e.g. one of the mobile device 2-1 to 2-3 of FIG. 1 that is different from the mobile device performing and/or controlling an example embodiment of the method according to the first exemplary aspect of the present invention).

Then, in another step 209, the obtained warning information is utilized to maintain the database (see step 201 of flowchart 200a of FIG. 2a). For instance, the database may be utilized to maintain the database by updating the database at least partially based on the obtained warning information (see step 208 of flowchart 200e of FIG. 2e).

Figure 3:
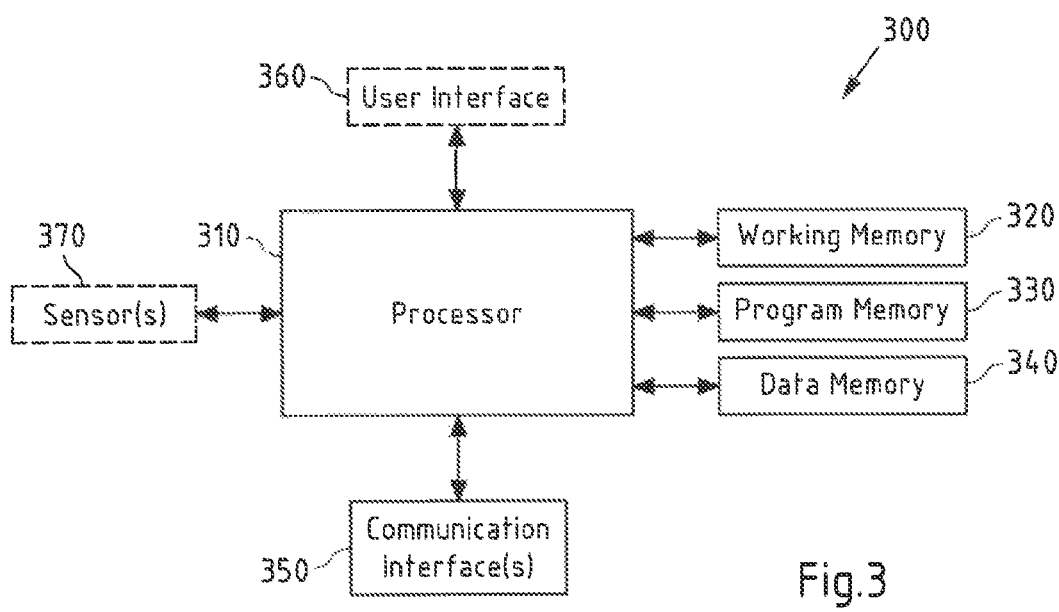
FIG. 3 is a block diagram of an exemplary embodiment of an apparatus according to the present invention.

FIG. 3 is a schematic block diagram of an apparatus 300 according to an exemplary aspect of the present invention, which may for instance represent at least one of the mobile devices 2-1 to 2-3 of FIG. 1.

Apparatus 300 comprises a processor 310, working memory 320, program memory 330, data memory 340, communication interface(s) 350, an optional user interface 360 and an optional sensor(s) 370.

Apparatus 300 may for instance be configured to perform and/or control or comprise respective means (at least one of 310 to 370) for performing and/or controlling the method according to the first exemplary aspect of the present invention. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control the method according to the first exemplary aspect of the invention of the present invention.

Processor 310 may for instance comprise an optional affected radio node identifier 311 as a functional and/or structural unit. Radio node identifier 311 may for instance be configured to identify an affected radio node (see step 202 of FIG. 2b).

Processor 310 may for instance comprise an optional warning information determiner 312 as a functional and/or structural unit. Warning information determiner 312 may for instance be configured to determine a warning information (see step 203 of FIG. 2c).

Processor 310 may for instance comprise an optional blocker 313 as a functional and/or structural unit. Blocker 313 may for instance be configured to block at least one of at least one affected radio node (see step 205 of FIG. 2d), a frequency-band associated with at least one affected radio node (see step 206 of FIG. 2d), and a radio-type associated with at least one affected radio node (see step 207 of FIG. 2d).

Processor 310 may for instance comprise an optional warning information obtainer 314 as a functional and/or structural unit. Warning information obtainer 314 may for instance be configured to obtain a warning information (see step 208 of FIG. 2e).

Processor 310 may for instance comprise an optional warning information utilizer 315 as a functional and/or structural unit. Warning information utilizer 315 may for instance be configured to utilize a warning information, e.g. to maintain (e.g. update) a database (see step 209 of FIG. 2e), to determine a position estimate, to name but a few non-limiting examples.

Processor 310 may for instance further control the memories 320 to 340, the communication interface(s) 350, the optional user interface 360 and the optional sensor(s) 370.

Processor 310 may for instance execute computer program code stored in program memory 330, which may for instance represent a computer readable storage medium comprising program code that, when executed by processor 310, causes the processor 310 to perform the method according to the first exemplary aspect of the present invention.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 330 may also be included into processor 310. This memory may for instance be fixedly connected to processor 310, or be at least partially removable from processor 310, for instance in the form of a memory card or stick. Program memory 330 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 330 may also comprise an operating system for processor 310. Program memory 330 may also comprise a firmware for apparatus 300.

Apparatus 300 comprises a working memory 320, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store one or more pieces of identifying information, one or more pieces of warning information, or the like, to name but a few non-limiting examples.

Communication interface(s) 350 enable apparatus 300 to communicate with other entities, e.g. with server 3 of FIG. 1, or with other mobile devices 2-1 to 2-3 of FIG. 1. The communication interface(s) 350 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 300 to communicate with further, for instance with radio nodes 4-1 to 4-5.

User interface 360 is optional and may comprise a display for displaying information to a user and/or an input device (e.g. a keyboard, keypad, touchpad, mouse, etc.) for receiving information from a user.

Sensor(s) 370 are optional and may for instance comprise a barometric sensor, e.g. to gather pressure information. Such pressure information may for instance enable three-dimensional positioning, since a respective pressure information may be indicative of an absolute or relative altitude (e.g. height above sea level) value.

Some or all of the components of the apparatus 300 may for instance be connected via a bus. Some or all of the components of the apparatus 300 may for instance be combined into one or more modules.

Figure 4:
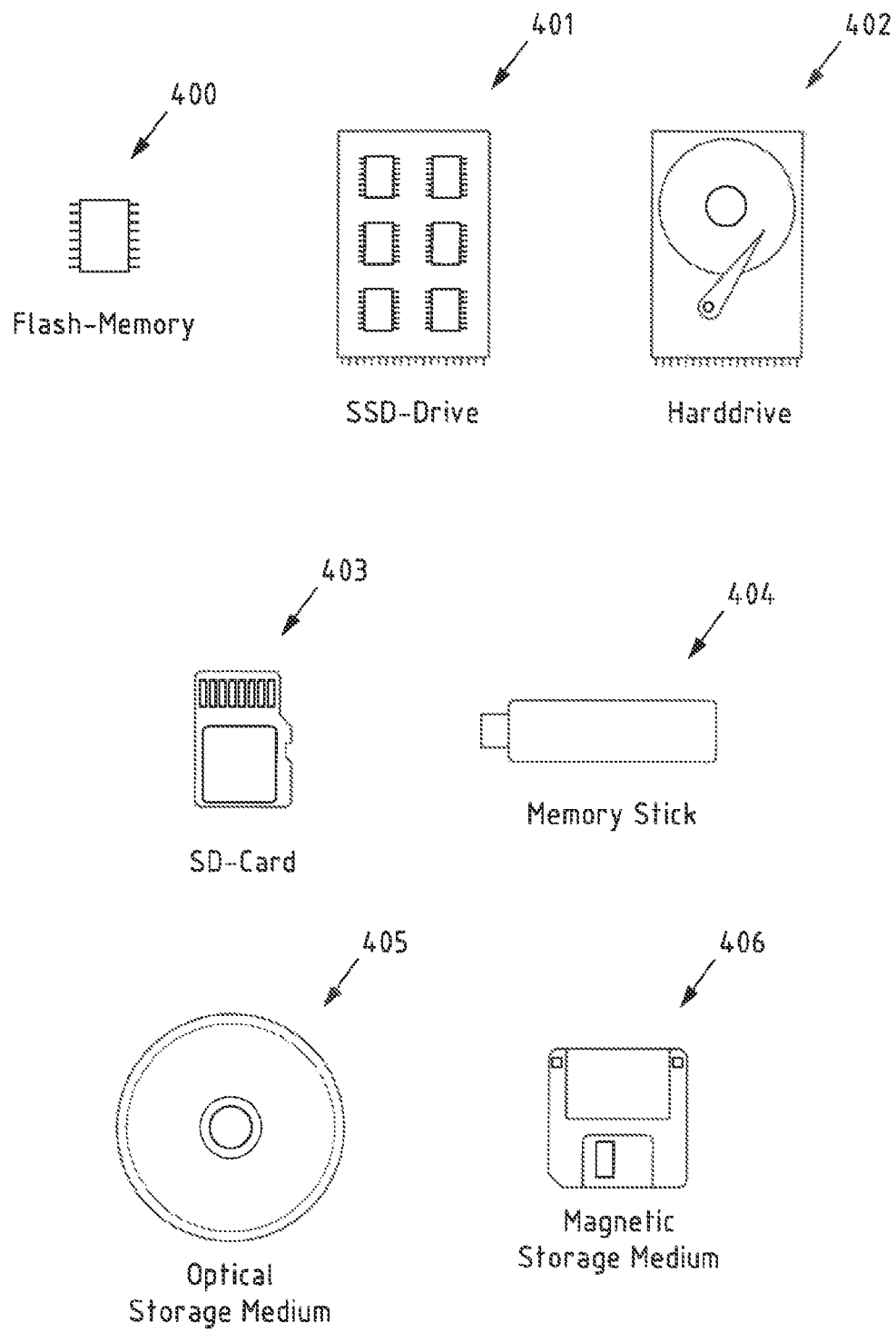
FIG. 4 is a schematic illustration of examples of tangible and non-transitory storage media according to the present invention.

FIG. 4 is a schematic illustration of examples of tangible and non-transitory computer-readable storage media according to the present invention that may for instance be used to implement one or more of the memories 320, 330 of FIG. 3. To this end, FIG. 4 displays a flash memory 400, which may for instance be soldered or bonded to a printed circuit board, a solid-state drive 401 comprising a plurality of memory chips (e.g. Flash memory chips), a magnetic hard drive 402, a Secure Digital (SD) card 403, a Universal Serial Bus (USB) memory stick 404, an optical storage medium 405 (such as for instance a CD-ROM or DVD) and a magnetic storage medium 406.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 310 of FIG. 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

In an example embodiment according to all aspect of the present invention, the method enables a (e.g. mobile) device to keep track of areas and/or radios, which are under spoofing/jamming/meaconing influence.

Such an area may be a geographical area (e.g. a 2D polygon), a venue or its section, and/or a floor or its section.

Such a radio may be a specific WiFi/Bluetooth/cellular/etc. node identified by its ID, information that a specific type of radio is under influence, information that a specific frequency band is under influence.

An action may be taken when arriving again in the affected area or when detecting a radio node, which has previously been detected to be spoofed.

Once spoofing/jamming/meaconing has been detected, keeping a database of those attempts in the device's non-volatile memory can e.g. be achieved by means of a simple geospatial database. When storing data for geographical areas, the Earth surface can be divided into a multi-scale grid (geospatial index) that allows associating data structures with geographical areas at varying spatial resolution (optimizing storage).

The data to be stored to the geospatial database can be e.g. one or more of the following:
radio types (WiFi, Bluetooth, cellular, etc.) under influence;
radio bands (2.4 GHz WiFi, 5 GHz WiFi, etc.) under influence;
type of influence (jamming/spoofing/meaconing);
identities of radio nodes under influence; and
whether the influence detection is reliable or uncertain; if the influence is continuous/sporadic/periodic.

Furthermore, such a geospatial database can be enriched with venue information (or with even more detailed information specifying a floor/section in the venue) to pinpoint the area/radio under influence more precisely.

Another type of a database can be a global database of radio node identities that are under influence. This data is not tied to any specific location.

When the device again enters the area of influence, the device may take several actions:
the sensitivity of spoofing/meaconing detection can be increased. This will increase the probability of detecting a spoofing attempt. This will also increase the rate of false positives, but this is acceptable under risky conditions.
block affected radio transmitters, radio types and radio bands from positioning
trust more on non-spoofable methods such as inertial and magnetic sensors Also, based on the global database of spoofed radio node identities, the device shall block those radio nodes from positioning regardless of the location.

In this way, maintaining (e.g. keeping) a database of influenced areas and radio transmitters is yet another line-of-defense against spoofing/jamming/meaconing. Keeping such a database internally in the device is especially useful for devices with limited connectivity, such as small CPU/memory/battery IoT devices.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, performed by at least one mobile device, comprising:

maintaining an affected node database comprising identifying information indicative of one or more radio nodes and/or of one or more areas within which the one or more radio nodes are located, wherein each respective radio node of the one or more radio nodes is identified, by the affected node database, as an affected radio node that is configured to enable positioning based on radio signals sent by said each respective radio node, wherein said positioning enabled by said each respective radio node is considered to be at least partially unexpected, and wherein the affected node database is at least part of a geospatial database corresponding to a multi-scale grid of at least a portion of a surface of the Earth; and while determining a position of the at least one mobile device:

determining whether the at least one mobile device is located within a respective area of the one or more areas is identified based on the one or more radio nodes and/or the one or more areas identified in the affected node database, and responsive to determining that the at least one mobile device is boated within the respective area, performing at least one of:

blocking a frequency-band associated with the affected radio node that is located within the respective area from being utilized for determining the position of the at least one mobile device based at least partially on frequency-band information associated with the affected radio node that is located within the respective area; or blocking a radio type associated with the affected radio node that is located within the respective area from being utilized for determining the position of the at least one mobile device based at least partially on radio-type information associated with the affected radio node that is located within the respective area.

2. The method according to claim 1, wherein the respective area of the one or more areas is one of following: i) a geographical area; ii) a venue or a section of the venue; or iii) a floor or a section of the floor.

3. The method according to claim 1, wherein the affected node database further comprises the radio-type information associated with the one or more radio nodes and/or the one or more areas.

4. The method according to claim 3; wherein the radio-type information is indicative of one of following types: i) a cellular-based type; ii) a WiFi-based type; or iii) a Bluetooth-based type.

5. The method according to claim 1, wherein the affected node database further comprises the frequency-band information associated with the one or more radio nodes and/or the one or more areas.

6. The method according to claim 5, wherein the frequency-band information is indicative of at least one of following frequency bands: short-range frequency-band; or long-range frequency-band.

7. The method according to claim 1; wherein the affected node database further comprises an influence information associated with the one or more radio nodes and/or the one or more areas, wherein the influence information represents that the positioning enabled by said each respective radio node of the one or more radio nodes and/or within the respective area of the one or more areas is considered to be potentially manipulated and a position estimated by said positioning is considered to be unexpected.

8. The method according to claim 1, wherein said each respective radio node of the one or more radio nodes and/or of the one or more areas is associated with a respective identifier enabling identification of said each respective radio node.

9. The method according to claim 8, wherein the respective identifier enabling the identification of said each respective radio node is configured so that a respective location of said each respective radio node is determinable at least partially based on the respective identifier.

10. The method according to claim 1, further comprising in case said positioning that is considered to be unexpected is considered to be spoofed, jammed, meaconed, or a combination thereof:
identifying the affected radio node and/or the affected radio node that is located within the respective area; and
blocking the affected radio node and/or the affected radio node that is located within the respective area from being utilized for determining the position of the at least one mobile device.

11. The method according to claim 10, further comprising:
determining a warning information indicative of the affected radio node and/or the affected radio node that is located within the respective area that is potentially manipulated; and
outputting the warning information enabling one or more other mobile devices to increase sensitivity level of detection of spoofing, jamming, meaconing, or a combination thereof of the one or more other mobile devices.

12. The method according to claim 11, wherein the warning information comprises one or more of following steps i) to iv) in case the warning information is associated with the affected radio node and/or the affected radio node that is located within the respective area: i) identifier of the affected radio node and/or the affected radio node that is located within the respective area; ii) the frequency-band information associated with the affected radio node and/or the affected radio node that is located within the respective area; iii) the radio-type information associated with the affected radio node and/or the affected radio node that is located within the respective area; or iv) the respective area in which the affected radio node and/or the affected radio node that is located the respective area is located.

13. The method according to claim 11, further comprising: obtaining a corresponding warning information output by a mobile device that is different from the at least one mobile device; and utilizing the obtained corresponding warning information to maintain the affected node database.

14. The method according to claim 1 wherein said each respective radio node of the one or more radio nodes and/or of the one or more radio nodes located within the one or more areas that equal a corresponding frequency-band information and/or corresponding radio-type information to the blocked frequency-band information and/or the blocked radio-type information is identified as a further affected radio node, wherein the further affected radio node is blocked from being utilized for the positioning.

15. An apparatus comprising at least one processor and at least one memory including computer program code, the at least one memory and the computer program code configured to, with the at least one processor; cause said apparatus to:
maintain an affected node database comprising identifying information indicative of one or more radio nodes and/or of one or more areas within which the one or more radio nodes are located, wherein each respective radio node of the one or more radio nodes is identified, by the affected node database, as an affected radio node that is configured to enable positioning based on radio signals sent by said each respective radio node of the one or more radio nodes,
wherein said positioning enabled by said each respective radio node is considered to be at least partially unexpected, and wherein the affected node database is at least a part of a geospatial database corresponding to a multi-scale grid of at least a portion of a surface of the Earth; and
while determining a position of at least one mobile device:
determine whether the at least one mobile device is located within a respective area of the one or more areas is identified based on the one or more radio nodes and/or the one or more areas identified in the affected node database; and
responsive to determining that the at least one mobile device is located within the respective area, perform at least one of:
blocking a frequency-band associated with the affected radio node that is located within the respective area from being utilized for determining the position of the at least one mobile device based at least partially on frequency-band information associated with the affected radio node that is located within the respective area; or
blocking a radio type associated with the affected radio node that is located within the respective area from being utilized for determining the position of the at least one mobile device based at least partially on radio-type information associated with the affected radio node that is located within the respective area.

16. The apparatus according to claim 15, wherein the affected node database further comprises an influence information associated with the one or more radio nodes and/or the one or more areas, wherein the influence information represents that the positioning enabled by said each respective radio node of the one or more radio nodes and/or within the respective area of the one or more areas is considered to be potentially manipulated and a position estimated by said positioning is considered to be unexpected.

17. The apparatus according to claim 15, wherein the at least one memory and the computer program code are further configured to, with the at least one processor, cause said apparatus, in case said positioning that is considered to be unexpected is considered to be spoofed, jammed, meaconed, or a combination thereof, to identify the affected radio node and/or the affected radio node that is located within the respective area.

18. The apparatus according to claim 17, wherein the at least one memory and the computer program code are further configured to, with the at least one processor, cause said apparatus to block the affected radio node and/or the affected radio node that is located within the respective area from being utilized for determining the position of the at least one mobile device.

19. The apparatus according to claim 15, wherein said each respective radio node of the one or more radio nodes and/or of the one or more radio nodes located within the one or more areas that equal a corresponding frequency-band information and/or a corresponding radio-type information to the blocked frequency-band information and/or the blocked radio-type information is identified as a further affected radio node, wherein the further affected radio node is blocked from being utilized for the positioning.

20. A non-transitory computer-readable storage medium storing computer program code that is configured to, when executed by a processor of an apparatus, cause the apparatus to:
   obtain one or more radio signal parameters corresponding to one or more radio signals observed by at least one mobile device, each of the one or more radio signals was transmitted by each respective radio node of one or more of radio nodes;
   determine, based at least in part on a radio map comprising radio models describing respective coverage area of one or more areas of the one or more of radio nodes that a positioning enabled by the one or more radio signals is at least partially unexpected;
   maintain an affected node database comprising identifying information indicative of the one or more radio nodes and/or of the one or more areas within which the one or more radio nodes are located,
   wherein said each respective radio node of the one or more radio nodes is identified, by the affected node database, as an affected radio node that is configured to enable positioning based on the one or more radio signals sent by said each respective radio node of the one or more radio nodes, wherein said positioning enabled by said each respective radio node is considered to be at least partially unexpected, and
   wherein the affected node database is at least part of a geospatial database corresponding to a multi-scale grid of at least a portion of a surface of the Earth; and
   while determining a position of the at least one mobile device:
   determine whether the at least one mobile device is located within the respective area of the one or more areas is identified based on the one or more radio nodes and/or the one or more areas identified in the affected node database, and
   responsive to determining that the at least one mobile device is located within the respective area, perform at least one of:
   blocking a frequency-band associated with the affected radio node that is located within the respective area from being utilized for determining the position based at least partially on frequency-hand information associated with the affected radio node that is located within the respective area; or
   blocking a radio type associated with the affected radio node that is located within the respective area from being utilized for determining the position based at least partially on radio-type information associated with the affected radio node that is located within the respective area.

* * * * *

UNITED STATES PATENT AND TRADEMARK OFFICE
CERTIFICATE OF CORRECTION

PATENT NO. : 11,408,972 B2
APPLICATION NO. : 16/723662
DATED : August 9, 2022
INVENTOR(S) : Lauri Aarne Johannes Wirola et al.

It is certified that error appears in the above-identified patent and that said Letters Patent is hereby corrected as shown below:

In the Claims

In Column 22, Line 24, Claim 1, delete "boated" and insert -- located --, therefor.

In Column 22, Line 47, Claim 4, delete "claim 3;" and insert -- claim 3, --, therefor.

In Column 22, Line 59, Claim 7, delete "claim 1;" and insert -- claim 1, --, therefor.

In Column 23, Line 46, Claim 12, delete "the" and insert -- within the --, therefor.

In Column 23, Line 56, Claim 14, delete "corresponding" and insert -- a corresponding --, therefor.

In Column 23, Line 64, Claim 15, delete "processor;" and insert -- processor, --, therefor.

In Column 24, Line 20, Claim 15, delete "database; and" and insert -- database, and --, therefor.

In Column 26, Line 18, Claim 20, delete "frequency-hand" and insert -- frequency-band --, therefor.

Signed and Sealed this
Twenty-ninth Day of August, 2023

Katherine Kelly Vidal
*Director of the United States Patent and Trademark Office*